May 18, 1926.

R. H. VANSANT

COMBINED STATEMENT AND CHECK

Filed Nov. 27, 1922

1,585,440

Inventor:
Richard H. Vansant
By: Wm. J. Belk
atty.

Patented May 18, 1926.

1,585,440

UNITED STATES PATENT OFFICE.

RICHARD H. VANSANT, OF CHICAGO, ILLINOIS, ASSIGNOR TO BLUE VALLEY CREAMERY CO., OF CHICAGO, ILLINOIS, A CORPORATION OF DELAWARE.

COMBINED STATEMENT AND CHECK.

Application filed November 27, 1922. Serial No. 603,385.

The object of this invention is to provide a convenient blank form comprising a statement to receive the full details of a transaction, and a detachable check for settlement of the transaction, the combined statement and check being adapted to be filled out in a suitable machine which makes one or more manifold copies at the same time for a permanent record, whereby the customer is fully informed as to the full details of the transaction when he receives the statement and check in settlement thereof, and is enabled to preserve for future use the record of such details while the check is passing through the regular bank channels back to the maker, and the said maker is provided with a duplicate of the details recorded on the statement and check so that both parties will have a full record of the transaction and the check can be readily identified with both the statement and the maker's record.

In the accompanying drawings I have illustrated an embodiment of the invention which has been used successfully and referring thereto—

Fig. 1 is a plan view of the check register, and

Fig. 2 is a plan view of the check with the statement thereto attached.

Referring to the drawings the check 3 and the statement 4 are printed on one sheet with an intermediate perforated line 5 to facilitate their separation. The check part 3 differs from the ordinary bank check in that the space 6 in which the name of the bank is preferably printed and the space 7 for the signature of the maker are located at the upper part of the check above the space 8 to receive the name, with or without the address, of the payee, and the number of the check is located at 9 and the amount of the check is located at 10 in a line adjacent the bottom of the check. The date 11 may be conveniently located as shown in a blank space above the payee space. The check may have printed thereon the usual authorization to the bank for payment and such other inscriptions as may be desirable for identification or other purposes.

The statement 4 has a date space 12. The date spaces on the check and statement are preferably located adjacent to the perforated line 5 and in substantial alignment with each other for convenience in filling in the date. At the bottom of the statement and check there are a plurality of spaces 13 arranged in a line for recording the complete details of the transaction and these spaces are indicated by printed legends 14 suitable for transactions in a certain line of business. These legends will vary more or less as the invention is used in different lines of business but they are preferably located closely adjacent to the bottom edge of the statement and check so that the particular details may be readily inserted by means of the machine which is used in making out the check and statement. The statement is also provided with such printed instructions, directions or guarantees as may be suitable for the line of business in which the check is used and these also may be varied as desired.

The invention is illustrated as adapted for use in a creamery where milk or cream is received, weighed, tested and paid for by check every day and the items of the transaction are plainly set forth on the statement and identified with the check. The statement shown has legends and spaces thereunder in which to record the amount of cream received, its test and butter fat, the price, gross amount, deductions and net amount to be paid; and the check has a space for the check number and the net amount to be paid. The spaces for insertion of these transactions are located adjacent to the lower edge of the statement and check so that the figures may be readily inserted on a suitable machine.

The check register 15 of Figure 1 has a line of legends across the sheet corresponding to the legends at the bottom of the statement and also a "Check No." legend corresponding in position to that legend on the check with a "Date paid" legend on one side thereof and "Remarks" legend on the other side thereof. This arrangement is made so that a manifold copy of the original figures printed on the statement and check may be made on the check register and they will appear under the proper legends or heading on the register just as they appear on the statement and check.

I have explained that the spaces for the details of the transactions are located adjacent the lower edge of the statement and check for convenience in printing the items thereon, but this has a further object of very material importance. The check register is provided with a space 16 to receive a date to designate the day when the cream was received and paid for and this date is inserted in the machine. The register with a sheet of carbon paper on the front thereof is then turned with the roller platen of the machine until the spaces under the legends or headings are in impression position. The check register and its carbon sheet are arranged in the machine in accordance with the usual manner of placing a sheet in the ordinary typewriting machine, but the check is slipped into place at the front of the platen roller and in front of the carbon sheet so that the spaces for items of the transaction will be located in impression position under the corresponding spaces on the check register. After the record is made the carriage is fed forward one space after the manner of the ordinary typewriting machine which releases the check and spaces the check register for another check so that the lines of impressions on the check register are close together like single spacing on a typewriter, whereby a single check register may carry the record of a great many checks.

The check and the check register are numbered for identification and when the check is returned through the banks to the maker an entry of the date is made on the check register under "Date paid" to indicate that the transaction is closed. The checks may be numbered consecutively or otherwise so that they can be readily identified. I have found it convenient to group the checks for each day and number the groups consecutively, providing a separate check register for each group which is numbered corresponding to the group. The checks in a group are also numbered consecutively so that the first check in a group recorded on sheet 1 of the check register will be numbered 1—1, the second 1—2 and so on. For the second group and second page of the check register the number would be 2—1 and 2—2 and so on. Thus the date and number on the check refers directly to the particular register sheet and line thereon to which the check belongs so that the paid entry may be readily made when the check is returned. If any question arises between the payee and the maker of the check with respect to the transaction it is not necessary for the payee to return the check because he and the maker both have a full itemization of the whole transaction and can correspond with reference thereto by simply referring to the check number or the date and the items of the transaction which will be sufficient to enable the maker to identify the transaction referred to on his check register.

I have found it convenient to insert the address and the dates on the statement and the check by means of an addressing machine, in one operation, and then to insert the items of the transaction on the bottom of the statement and check and on the check register by means of a billing machine.

My invention provides a simple and easy means whereby a large amount of business can be very expeditiously transacted and a complete record furnished to each transaction giving all the details thereof and provided with suitable checks so that they can be readily identified. The location of the spaces for receipting the transaction items at the bottom of the combined statement and check is of special importance as herein pointed out particularly because it enables these items to be recorded on a single line on the statement and check and also enables a manifold copy of the items on a plurality of checks to be recorded in close spacing on the register sheet.

For convenience in description I have referred to the part 3 as the check and the part 4 as the statement but both of these parts, without being separated, are sent to the customer and hence it is customary to refer to the entire sheet or slip as the check although one part is intended for deposit in the bank and the other part is intended to be retained by the customer or shipper for his record.

The character of the legends, the size of the spaces thereunder as well as the number and relative arrangement thereof may be varied to suit different conditions and different businesses and I reserve the right to make all such changes as fairly fall within the scope of the following claim.

I claim:

A combined statement and check consisting of a strip having a separation line dividing it into a statement part and a check part, the statement part having approximately designated spaces arranged in a line adjacent its bottom edge to receive items of a transaction and the check part having appropriately designated spaces in a line adjacent its botom edge to receive the amount of the check in words and in figures, said spaces on the check part being arranged in alignment with said spaces on the statement part, the check part also having appropriately designated spaces for the name of the maker and the name of the bank and for the name and address of the payee.

RICHARD H. VANSANT.